Feb. 6, 1962  D. J. SHEEHAN, JR., ET AL  3,019,927
METHOD AND APPARATUS FOR TRANSPORTING BEAMS
Filed Dec. 5, 1958  4 Sheets-Sheet 1

INVENTORS.
DANIEL J. SHEEHAN, JR
FRED J. STEPHAN.
BY
Lockwood, Woodard, Smith & Weikart
ATTORNEYS.

Feb. 6, 1962 D. J. SHEEHAN, JR., ETAL 3,019,927
METHOD AND APPARATUS FOR TRANSPORTING BEAMS
Filed Dec. 5, 1958 4 Sheets-Sheet 2
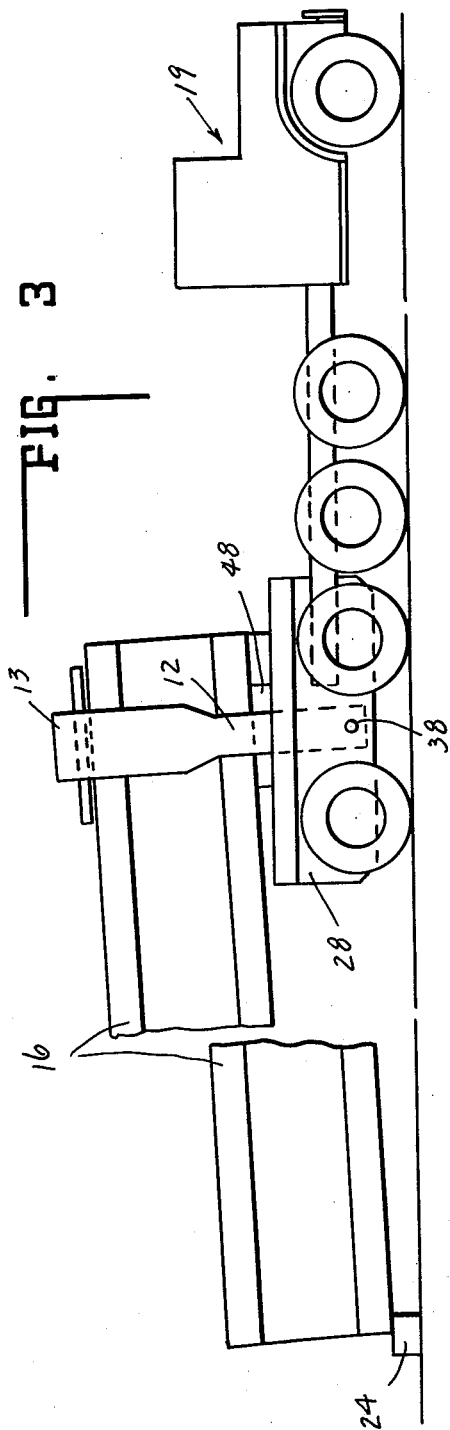
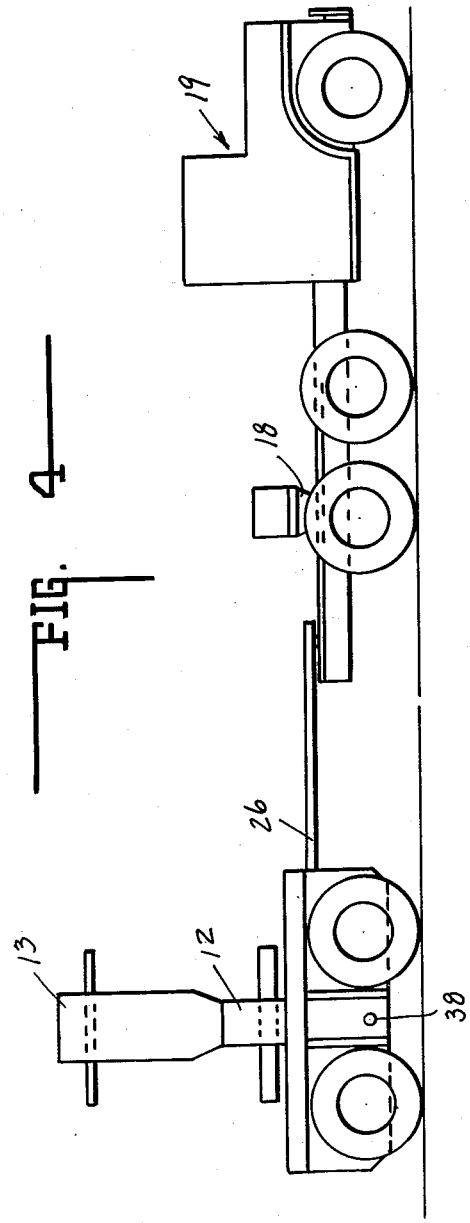
INVENTORS.
DANIEL J. SHEEHAN, JR.
FRED J. STEPHAN.
BY
Lockwood, Woodard, Smith & Weikart.
ATTORNEYS.

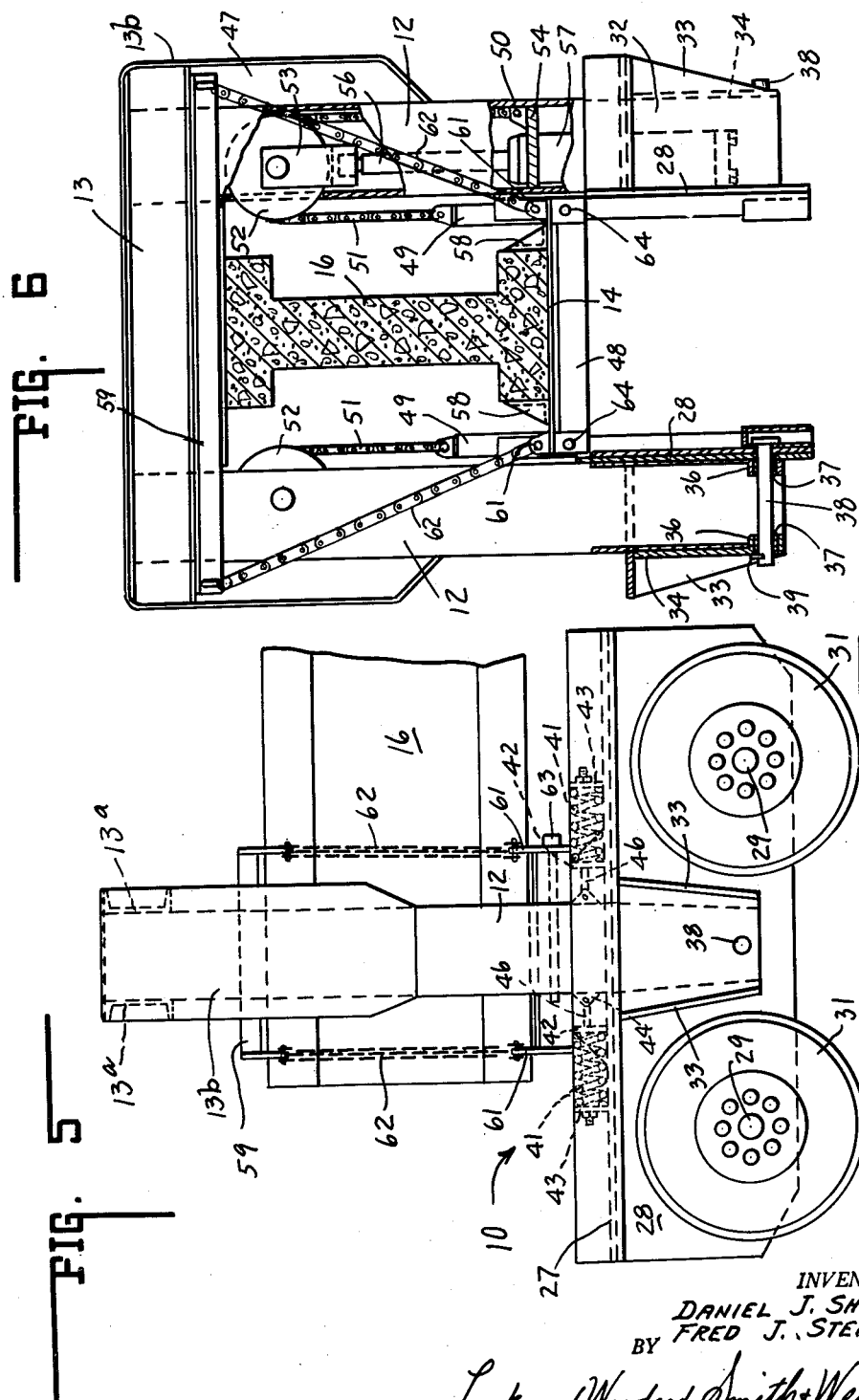

Feb. 6, 1962  D. J. SHEEHAN, JR., ETAL  3,019,927
METHOD AND APPARATUS FOR TRANSPORTING BEAMS
Filed Dec. 5, 1958  4 Sheets-Sheet 4

INVENTORS.
DANIEL J. SHEEHAN, JR.
FRED J. STEPHAN.
BY
Lockwood, Woodard, Smith & Weikart
ATTORNEYS.

United States Patent Office 3,019,927
Patented Feb. 6, 1962

3,019,927
METHOD AND APPARATUS FOR
TRANSPORTING BEAMS
Daniel J. Sheehan, Jr., P.O. Box 430, and Fred J. Stephan, 1318 N. Logan Ave., both of Danville, Ill.
Filed Dec. 5, 1958, Ser. No. 778,345
4 Claims. (Cl. 214—396)

This invention relates generally to the transporting of elongated, heavy loads and in particular to a method and apparatus for loading, unloading and transporting members such as pre-stressed concrete beams or the like.

The handling and transporting of elongated, heavy loads, such as pre-stressed concrete beams, both on and off the highway, conventionally requires tandem tractor and trailer equipment. Conventional practice also requires the use of cranes and other hoisting machinery to load and unload the tractor-trailer combination at the point of shipment origin and destination.

The primary object of the present invention is to provide a method and apparatus which eliminates the need for cranes or other auxiliary hoisting machinery in placing a load such as a heavy beam on the transporting equipment.

A further object of the present invention is to provide a self-propelled trailer structure, incorporating means for raising and lowering its load, the trailer structure serving both as a support trailer in transporting the load and as a hoist in loading and unloading the beam, or similar elongated member, forming the load.

A further object of the present invention is to provide a trailer structure, incorporating a load arch adapted to straddle the load, the load arch being pivotally supported on the trailer structure, whereby the trailer wheel carriage may articulate or pivotally move with relation to the load arch when travelling over rough or rutted terrain.

A further object of the present invention is to provide a structure of the type referred to above wherein a movable load platform carried by the columns of the load arch may be locked in transport position, the locking arrangement preventing spreading of the load arch columns under heavy load and under the impact induced by travel over rough terrain.

The full nature of the invention will be understood from the accompanying drawings and the following description and claims:

FIG. 3 is a view similar to FIG. 1, but showing the apparatus positioned for a later step in the unloading operation.

FIG. 4 is an illustration of the apparatus embodying the present invention.

FIG. 5 is a side view of apparatus embodying the present invention.

FIG. 6 is an end view of the apparatus shown in FIG. 5, but having certain of the parts omitted.

Figure 1:
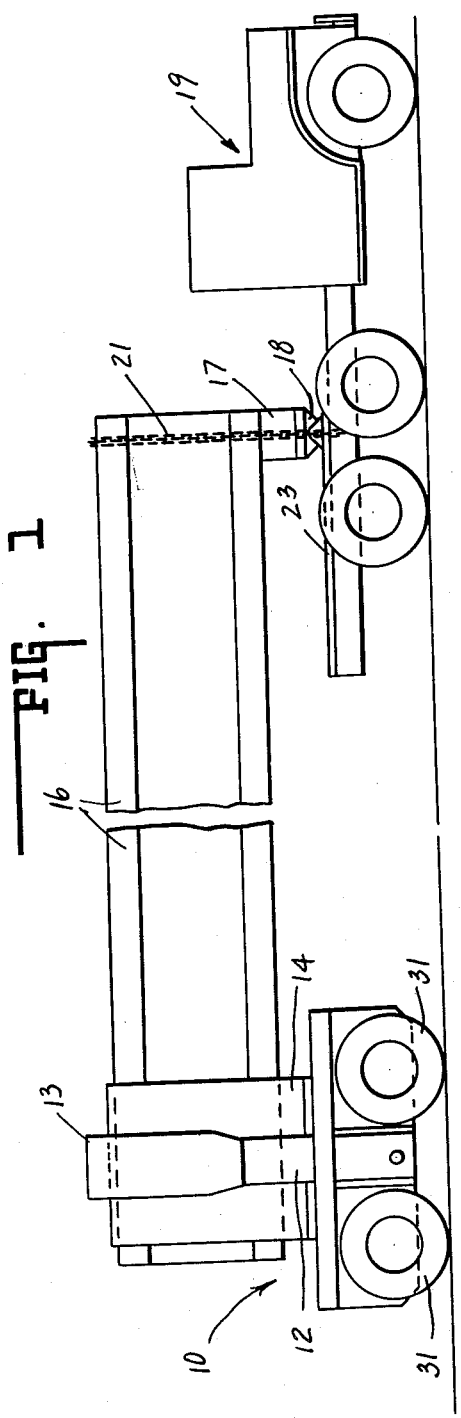
FIG. 1 is a side view of the apparatus in load carrying position.

Referring initially to FIG. 1, the mobile hoisting apparatus embodying the present invention is shown generally at 10. The apparatus includes spaced trucks carrying wheels 31, and having pivotally supported thereon spaced columns 12 which extend vertically upward. The upper ends of the columns are rigidly joined by a transverse or top member 13. Movably supported between the columns is a load arm or platform 14. The means for support and movement of the load arm will be subsequently described; however, its function is to support one end of an elongated load member, here shown to be a pre-stressed concrete beam 16.

The opposite end of the beam is supported on a bolster 17 attached to the fifth wheel 18 of a prime mover, such as the tractor 19. Means, such as chain 21, may be used to secure the load to the loading platform of the tractor. When so supported, it will be evident that the beam may be transported with the mobile hoisting apparatus 10 serving as a trailer supporting the rear end of the beam. Where motor vehicle laws permit, no tongue or other mechanical device is required to connect the hoisting apparatus to the tractor, the load itself acting as a connecting device. In those cases where an auxiliary tying device is required, any sizable member, such as a pipe, timber or steel section, may be pinned between the hoisting apparatus and the tractor.

Figure 2:
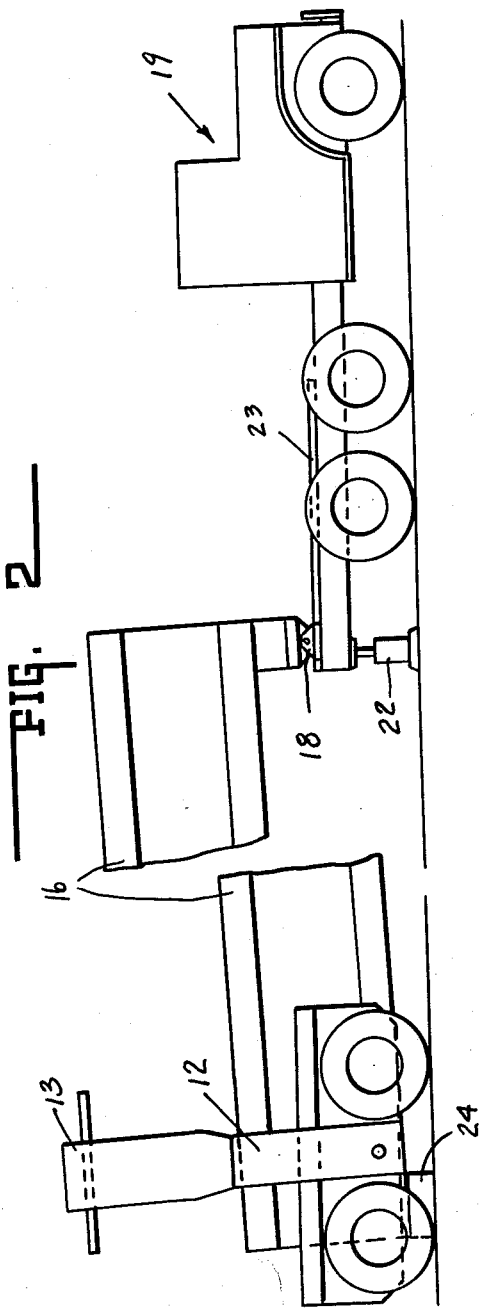
FIG. 2 is a view similar to FIG. 1, but showing the apparatus as positioned during the unloading process.

The existing design and reinforcing methods used in the construction of many prestressed concrete sections require that the beam be handled only on its extreme ends, usually within the first thirty-six inches of the ends. Raising, hoisting or handling the beam beyond these points tends to set up undue stresses, resulting in cracking or failure of the section. To accommodate these types of loads the tractor is equipped with an extended frame and counterbalance jacks 22 are used as shown in FIG. 2. The unloading process for this type of beam further requires that the fifth wheel 18 of the tractor be shiftable toward the front and rear of the tractor frame. The particular means for shifting the fifth wheel of the tractor forms no part of the present invention and is, therefore, not shown in detail; however, it might include guides 23 for defining the position of the fifth wheel.

When transporting the load, the front of the load is positioned to give the most satisfactory combination of weight distribution over the tractor axles. Where the load is a pre-stressed concrete beam, in preparing to unload, the counterbalance jacks 22 are placed under the tractor frame, as shown in FIG. 2. The fifth wheel 18 is then unloaded and is pulled or jacked out to the end of the tractor frame, the hoisting apparatus 10 being permitted to freewheel rearward. An alternate process for positioning the fifth wheel in the unloading process involves equipping the jacks 22 with wheels or rollers, then blocking the wheels 31 of the hoisting apparatus and driving the tractor forward.

The unloading process may be continued by causing the hoisting apparatus to lower its end of the beam onto a bolster or block 24 (FIG. 2). The hoisting apparatus 10 is then moved to the rear of the tractor, straddling the beam as it progresses. When the hoisting apparatus reaches the rear of the tractor, as shown in FIG. 3, the tractor is driven out from under the load and the load is lowered and a bolster (not shown) properly placed on the ground.

With the unloading completed, the hoisting apparatus may then be connected to the rear of the tractor by any suitable means such as the bale or tongue 26, and towed behind the tractor for return to the loading point.

Loading is accomplished in the reverse fashion to that described with reference to unloading. The front of the load, resting on a suitable bolster, is lifted off the ground by the hoisting apparatus. The tractor is backed under the load and the hoisting apparatus is caused to lower the load onto the tractor. The hoisting apparatus is then moved to the rear end of the load and is caused to raise this end of the load into proper carrying position. The load may then be clamped or bound to the apparatus 10 and is ready for transport.

Referring now to FIGS. 5, 6, 7 and 8, the hoisting apparatus will be described in detail. As may be seen in FIG. 5, the hoisting apparatus includes spaced truck frames, each including a top plate 27 and depending back plates 28. Wheel spindles 29 are mounted on the truck frames and upon the spindles are bolted wheels 31 which support the hoisting apparatus 10. The wheels are equipped with brakes, of the internal type, which provide friction braking action against the wheel drums. It will be understood that the wheels are of the dual type, only one wheel of each pair being visible in the drawings.

As may best be seen in FIG. 6, each of the truck frames has extending vertically therefrom a column 12 fabricated of plates to form a rigid box section. The columns are supported on the truck frames by placing them in a box section well 32 formed by the backing plate 28, gusset plates 33 and exterior plate 34. Bosses 36 are welded to the interior of the columns and support bearings 37 which, in turn, support pivot pins 38. The pivot pins extend through their respective columns and the columns are retained on the pins by any suitable means, such as retainer members 39. The columns are thus pivotally supported at pins 38 on the truck frames. As may be seen in FIGS. 5 and 7, the columns are biased to vertical position with relation to the truck frames by means of heavy compression springs 41. The springs are anchored at one end to stationary plates 42 and at their other end engage a movable plate 43. Movement of the plates 43 is transferred to the column engaging shoes 44 by means of thrust rods 46.

As may be seen in FIGS. 5 and 6, the upper ends of the columns are rigidly joined by means of the top member 13 formed of channels 13a and an exterior plate 13b supported on outboard gussets 47. The load 16 is supported between the columns by means of a load carrying arm including the top plate 14 and supporting ribs 48. The top plate may be provided with a suitable cushioning pad of rubber or similar material. Structural members 49 are rigidly secured to a load arm and extend upwardly therefrom adjacent each of the columns. Secured to the upper ends of the members 49 are chains 51 which pass over idler sheaves 52 and are anchored at 50 to heavy plates 54. The sheaves 52 are supported by yokes 53 which are rigidly attached to shafts 56. The shafts 56 are positioned by means of hydraulic cylinders 57 mounted within the column. The cylinders are provided with hydraulic pressure from a suitable source thereof carried by the hoisting apparatus, as will subsequently be described with reference to FIG. 7.

The load arm is provided with load shoes 58 which may be positioned against the lower margin of the beam forming the load and serve to guide the hoisting apparatus as it moves along the beam, thereby insuring that the beam is properly centered on the load arm. As may best be seen in FIG. 5, a member 59 overlies the beam and is secured to members 61, carried by the load arm, by means of chains or boomers 62. The member 59 thus serves as a top clamp to hold the beam and arch in 90° relationship during transport.

To raise or lower the load, the hydraulic cylinders 57 may be uniformly actuated to raise or lower the sheaves. This action serves to move the load arm, the inner face of the columns 12 being slotted to permit the required freedom of vertical movement of the sheaves.

Means are provided for locking the load arm in the position in which it has been placed by the hydraulic cylinders. This means includes locking pins 63 (FIG. 5). The pins extend lengthwise of the truck frames and through the columns and into apertures 64 in the load arm assembly. The pins serve the function of providing a means for locking the load arm assembly in load carrying position, thus releasing the lifting mechanism. Because they are disposed lengthwise of the truck frames, the pins also provide a mechanical or structural tie between the two columns in a position relatively close to the ground, thus preventing the columns and the truck frames from spreading apart while the beam or load is in transit.

Figure 7:
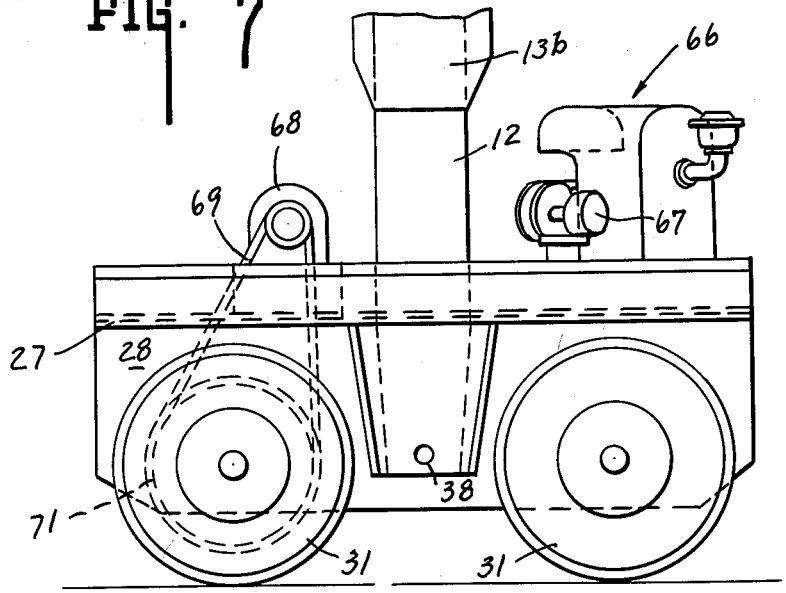
FIG. 7 is a side view of the apparatus similar to FIG. 5 but schematically showing the placement of the driving means for the apparatus.

FIG. 7 illustrates schematically certain of the power elements for the hoisting apparatus. Since these elements are all conventional and are conventionally linked to their various driven elements, they are not described in detail. An internal combustion engine 66 is mounted on one of the truck frames and provides the power source for the hoisting apparatus. This engine drives a hydraulic pump 67 which supplies hydraulic force to the lifting cylinders 57 and to the hydraulic drive motor 68. The drive motor may be caused to drive one of the wheels 31 of the hoisting apparatus by any suitable means, such as the chain and sprocket drive indicated schematically at 69 and 71 in FIG. 7. It will be understood that two drive motors 68 and two sprocket arrangements are used on the hoisting apparatus, one located on each of the truck frames with one set of wheels on each frame being powered. A suitable clutch arrangement (not shown) may be provided to disengage the drive motor from the power transmission system to the wheels 31 when the hoisting apparatus is being towed or trailed behind the tractor.

Hydraulic control valves (not shown) permit each hydraulic motor 68 to be operated independently of the other. When both motors are operated simultaneously, the hoisting apparatus is propelled either forwardly or rearwardly along the beam. By operating only one hydraulic motor, only one set of wheels being thereby driven, the hoisting apparatus may be steered.

When trailing behind the tractor, the hoisting apparatus is controlled as to braking action by internal band brakes previously mentioned. The brakes may be actuated from an air hose (not shown) which may be passed to the tractor and connected to the compressed air supply conventionally provided on such tractors.

The method and apparatus just described may be seen to eliminate the need for cranes or other auxiliary hoisting machinery to place an elongated heavy load on the tractor and trailer and to remove the load at its destination. The hoisting apparatus herein described thus serves as a trailer and as a hoisting and lowering machine. The apparatus has herein been described as particularly adapted for handling of pre-stressed concrete bridge beams; however, it is capable of handling any elongated massive loads, such as timber, poles or steel shapes of various cross section.

The arrangement whereby the columns 12 are pivotally joined to the truck frames by means of pins 38 permits limited movement of the columns with relation to the truc kframes against the force exerted by the springs 41. This articulation of the columns permits the truck frames to move independently of the columns when the hoisting apparatus is being drawn over rough or rutted areas.

While the invention has been disclosed and described in some detail in the drawings and foregoing description, they are to be considered as illustrative in character, as other modifications may readily suggest themselves to persons skilled in this art and within the broad scope of the invention, reference being had to the appended claims.

The invention claimed is:

1. In a mobile apparatus adapted to support one end of an elongated heavy load member such as a concrete beam or the like: dual wheeled trucks adapted to be disposed on opposite sides of said load member, each of said trucks including side members and wheels mounted in spaced relation on said side members, tubular arch columns pivotally supported on said side members midway between said wheels and extending above said load member, a cross member rigidly joining the upper ends of said columns, an idler sheave supported for vertical movement within each of said columns, chains anchored at one end to said columns and extending over said sheaves to support a load receiving arm between said columns, power means including hydraulic cylinders mounted within said columns and adapted to position said sheaves and consequently said load arm, and centering springs carried by said trucks and acting on said columns to bias said columns upright with relation to said trucks, whereby said trucks may articulate with relation to said columns and against the force exerted by said centering springs when traversing rutted surfaces.

2. In a mobile apparatus adapted to support one end of an elongated heavy load member such as a concrete beam or the like: dual, wheeled trucks adapted to be disposed on opposite sides of said load member, each of said trucks including side members and wheels mounted in spaced relation on said side members, tubular arch columns pivotally supported on said side members midway between said wheels and extending above said load member, a cross member rigidly joining the upper ends of said columns, an idler sheave supported for vertical movement within each of said columns, chains anchored at one end to said columns and extending over said sheaves to support a load receiving arm between said columns, power means mounted within said columns and adapted to position said sheaves and consequently said load arm, and resilient centering means carried by said trucks and acting on said columns to bias said columns upright with relation to said trucks, whereby said trucks may articulate with relation to said columns and against the force exerted by said centering means when traversing rutted surfaces.

3. In a mobile apparatus adapted to support one end of an elongated heavy load member such as a concrete beam or the like: dual, wheeled trucks adapted to be disposed on opposite sides of said load member, tubular arch columns pivotally supported on said trucks and extending above said load member, a cross member rigidly joining the upper ends of said columns, an idler sheave supported for vertical movement within each of said columns, flexible load bearing elements anchored at one end to said columns and extending over said sheaves to support a load receiving arm between said columns, power means mounted within said columns and adapted to position said sheaves and consequently said load arm, centering springs carried by said trucks and acting on said columns to bias said columns upright with relation to said trucks, whereby said trucks may articulate with relation to said columns and against the force exerted by said centering springs when traversing rutted surfaces, and locking means cooperating with said columns and said load arm to remove the load from said power means and to prevent spreading of said columns under load.

4. A mobile apparatus as claimed in claim 3, wherein the locking means comprises pins removably inserted through accommodating openings in said columns and said load arm, said pins extending generally transverse both to the axis of said columns and to the axis of said cross member.

References Cited in the file of this patent

UNITED STATES PATENTS

| | | |
|---|---|---|
| 1,595,512 | Glogger | Aug. 10, 1926 |
| 2,043,507 | Culemeyer | June 9, 1936 |
| 2,240,564 | LeTourneau | May 6, 1941 |
| 2,403,833 | Spangler | July 9, 1946 |
| 2,767,870 | Gove | Oct. 23, 1956 |
| 2,792,079 | Gibson | May 14, 1957 |
| 2,807,477 | Tuso | Sept. 24, 1957 |